United States Patent
Dan et al.

(10) Patent No.: US 10,839,132 B2
(45) Date of Patent: Nov. 17, 2020

(54) AUTOMATIC COVER POINT GENERATION BASED ON REGISTER TRANSFER LEVEL ANALYSIS

(71) Applicant: International Business Machines Corporation, Armonk, NY (US)

(72) Inventors: Kousik Dan, Bengaluru (IN); Sandeep Korrapati, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/279,936

(22) Filed: Feb. 19, 2019

(65) Prior Publication Data

US 2020/0265123 A1    Aug. 20, 2020

(51) Int. Cl.
*G06F 30/30* (2020.01)
*G06F 30/398* (2020.01)
(Continued)

(52) U.S. Cl.
CPC ............ *G06F 30/398* (2020.01); *G06F 30/30* (2020.01); *G06F 30/33* (2020.01); *G06F 30/3323* (2020.01)

(58) Field of Classification Search
CPC .. A61K 2300/00; A61K 31/74; A61K 9/2095; G06F 9/4494; G06F 8/20; G06F 30/30; G06F 19/3456; G06F 8/34; G06F 16/212; G06F 16/26; G06F 2111/02; G06F 2111/04; G06F 2111/10; G06F 2111/12; G06F 2111/20; G06F 2119/18; G06F 30/13; G06F 30/333; G06F 3/048; G06F 9/44; G06F 19/00; G06F 30/33; G06F 30/327; G06F 9/505; G06F 13/00; G06F 9/3016; G06F 9/30192; G06F 9/3851; G06F 11/3452; G06F 16/90344; G06F 17/16; G06F 17/17; G06F 19/3468; G06F 30/34; G06F 8/4441; G06F 9/30036; G06F 9/3005; G06F 9/324; G06F 9/3802; G06F 9/3836;
(Continued)

(56) References Cited

U.S. PATENT DOCUMENTS 9,355,206 B2    5/2016  Ikram et al.
2011/0113392 A1*  5/2011  Chakraborty ............ G09C 1/00
                                                    716/102
(Continued)

FOREIGN PATENT DOCUMENTS

CN           107480382 A       12/2017

OTHER PUBLICATIONS

English translation of China Patent Application Publication CN107480382A, dated Dec. 15, 2017.
(Continued)

*Primary Examiner* — Binh C Tat
(74) *Attorney, Agent, or Firm* — Martin & Associates, LLC; Derek P. Martin

(57) ABSTRACT

Cover points are automatically generated based on analysis of the hardware design represented in register transfer level (RTL) of a hardware description language. A cover point generator uses uncertainty of event occurrence, critical point analysis and redundancy elimination to determine consequential cover points for function verification. A user may provide input parameters to the cover point generator to define depth and width of cover events for generating cover points.

8 Claims, 6 Drawing Sheets

(51) Int. Cl.
*G06F 30/33* (2020.01)
*G06F 30/3323* (2020.01)

(58) Field of Classification Search
CPC .. G06F 9/3887; G06F 9/4484; G06F 9/45533;
G06F 9/46; G06F 9/4881; G06F 9/5027;
G06F 9/5077; G06F 9/5094; G06F 9/52;
G06F 9/3001; G06F 9/30014; G06F
9/30087; G06F 9/3009; G16H 10/60;
G06N 3/0454; G06N 3/0445; G06N
3/084; G06K 9/4628; G06K 9/6201
USPC .................................................. 716/100–106
See application file for complete search history.

(56) References Cited

U.S. PATENT DOCUMENTS

| | | | | |
|---|---|---|---|---|
| 2012/0084067 | A1* | 4/2012 | Ispir | ............... G06F 30/327 |
| | | | | 703/14 |
| 2017/0017747 | A1* | 1/2017 | Cho | ............... G06F 30/30 |
| 2018/0101632 | A1 | 4/2018 | Kim | |

OTHER PUBLICATIONS

Abstract, Mandouh et al., "Automatic Generation of Functional Coverage Models", IEEE International Symposium on Circuits and Systems (ISCAS), 2016.

\* cited by examiner

| Node | Total Weight | In Weight | Out Weight | Expression | Improbability Rating |
|---|---|---|---|---|---|
| A0 | 2 | 0 | 2 | Input | 1 |
| A1 | 2 | 0 | 2 | Input | 1 |
| B | 6 | 3 | 3 | (A0.A1)+(B) | (1x3+1x3)+1=7 |
| C | 4 | 2 | 2 | A0+A1 | 1+1=2 |
| D | 2 | 1 | 1 | !B | 1x2=2 |
| E | 3 | 2 | 1 | BxC | 7x3+2x3=27 |
| F | 3 | 1 | 1 | C | 2 |
| G | 5 | 4 | 1 | (ExF).(D+H) | (27x2+2x2)x3+(2+18)x3=294 |
| H | 3 | 1 | 2 | !I | 2x9=18 |
| I | 5 | 2 | 3 | F.I | 2x3+1x3=9 |
| J | 2 | 2 | 0 | G.H | 294x3+18x3=936 |
| K | 1 | 1 | 0 | I | 18 |

| Output | |
|---|---|
| Nodes | Transitions |
| B | B->G |
| C | C->I |
| E | |
| F | |
| G | |
| H | |
| I | |

FIG. 5C

AUTOMATIC COVER POINT GENERATION BASED ON REGISTER TRANSFER LEVEL ANALYSIS

BACKGROUND

1. Technical Field

This disclosure generally relates to computer system testing, and more specifically relates to a system and method for automatic cover point generation based on register transfer level (RTL) analysis of an electronic circuit represented in a hardware description language.

2. Background Art

Digital integrated circuits are often designed with a hardware description language (HDL). The HDL is a specialized computer language used to describe the structure and behavior of digital logic circuits. In HDL, a register-transfer level focuses on describing the flow of signals between registers. The register-transfer level describes the combinational logic by using constructs that are similar to programming languages such as if-then-else and arithmetic operations.

Designers attempt to verify the operation of an integrated circuit in a process called functional verification. A coverage model provides a measure of the completeness of the functional verification. The coverage model can be used to improve the quality of test generation. Functional verification is measured using code coverage or functional coverage. Where functional coverage is used, cover points identify locations in the design where testing is needed. Manual listing of functional cover points for a large complex design is very cumbersome and time consuming, and there is a significant probability of missing significant cover points when using a manual process.

BRIEF SUMMARY

Cover points are automatically generated based on analysis of the hardware design represented in register transfer level (RTL) of a hardware description language. A cover point generator uses uncertainty of event occurrence, critical point analysis and redundancy elimination to determine consequential cover points for function verification. A user may provide input parameters to the cover point generator to define depth and width of cover events for generating cover points.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIGS. 5A-5C illustrate examples of generating cover points for the hardware design shown in FIG. 3.

DETAILED DESCRIPTION

The disclosure and claims herein relate to a system and method for generating cover points for functional verification of an integrated circuit. Cover points are automatically generated based on analysis of the hardware design represented in register transfer level (RTL) of a hardware description language. A cover point generator uses uncertainty of event occurrence, critical point analysis and redundancy elimination to determine consequential cover points for function verification. A user may provide input parameters to the cover point generator to define depth and width of cover events for generating cover points.

Figure 1:
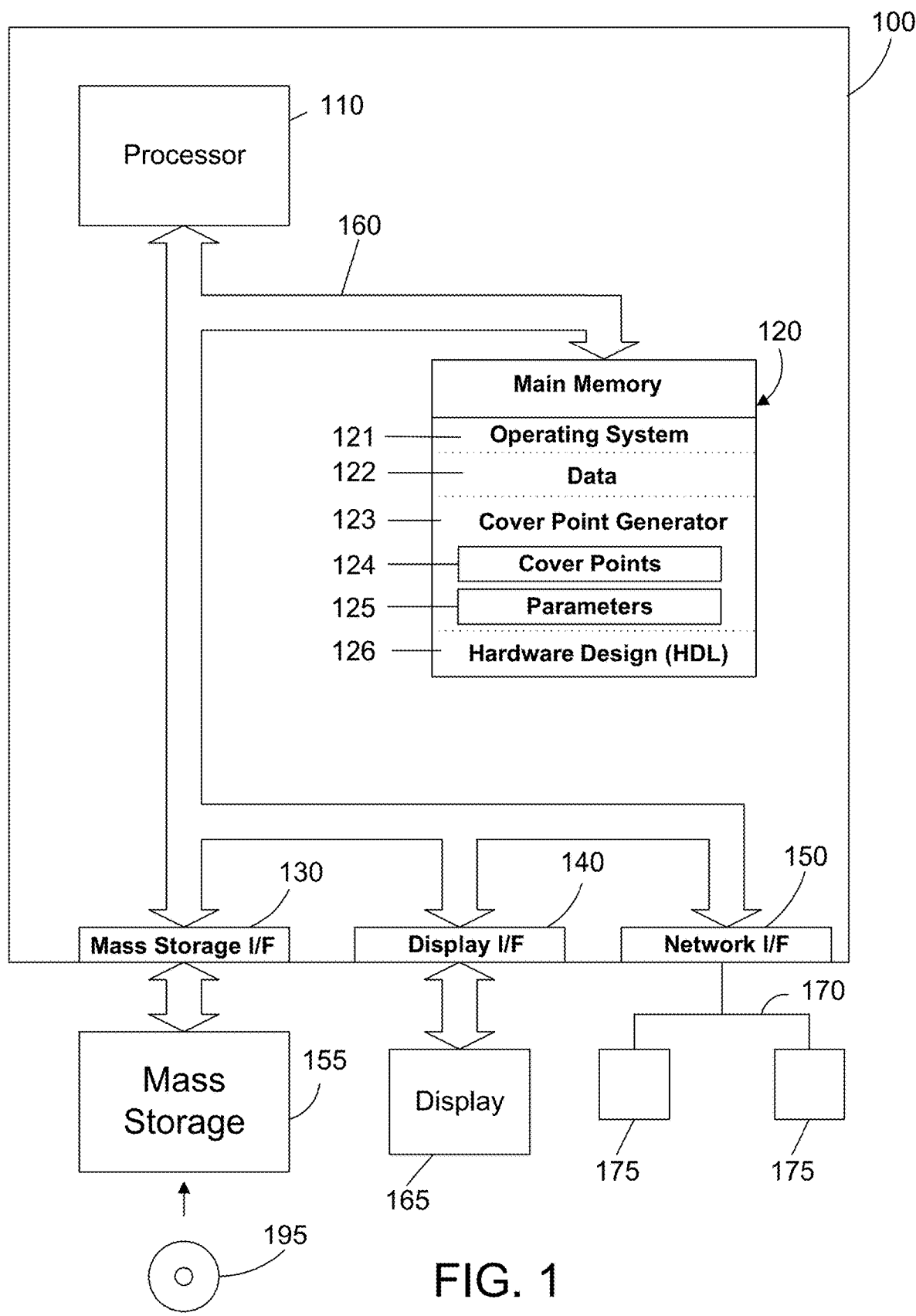
FIG. 1 is a block diagram a computer system with a cover point generator for automatically generating cover points.

Referring to FIG. 1, a computer system 100 is one suitable implementation of a computer system that is capable of performing the computer operations described herein including generating cover points for functional verification of an integrated circuit. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes data 122 and a cover point generator 123 that generates cover points 124 using parameters 125. The memory 120 also includes a hardware design 126 represented in hardware description language (HDL).

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, data 122, cover point generator 123, cover points 124, parameters 125 and the hardware design 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the cover point generator 123 as directed by a user.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
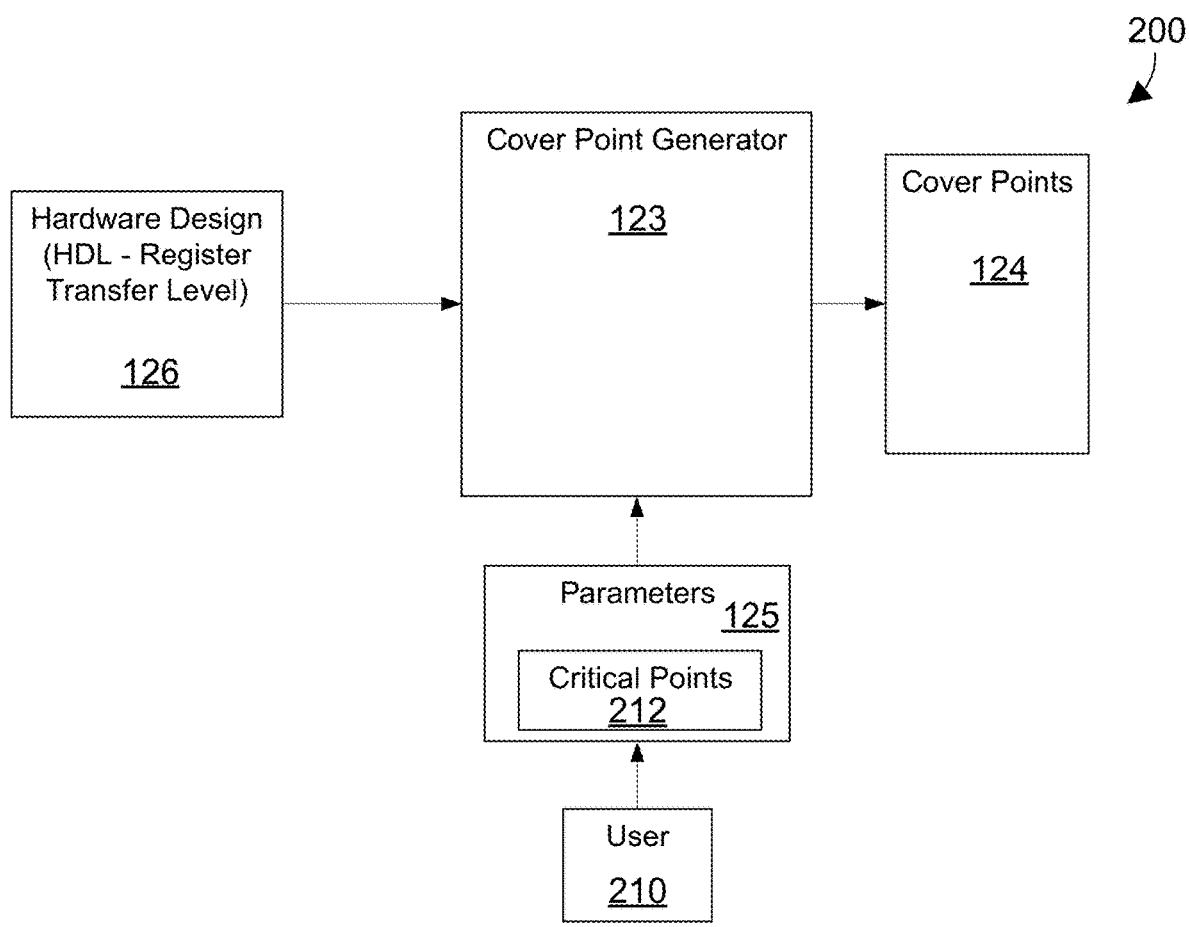
FIG. 2 is block diagram of a system for automatic cover point generation as described herein.

FIG. 2 illustrates a block diagram of system 200 for generating cover points for functional verification of an electronic design using a computer system, for example, computer system 100 shown in FIG. 1. The system 200 includes a cover point generator 123 that inputs a hardware design 126 and generates cover points 124 for functional verification of the hardware design that may be implemented in an integrated circuit. The cover point generator analyzes the hardware design represented in an hardware description language, for example, in register transfer level (RTL). The cover point generator 123 uses parameters 125 to filter the cover points as described below. The cover point generator may use uncertainty of event occurrence, critical point analysis and redundancy elimination to determine consequential cover points for function verification. A user 210 may provide and/or modify parameters 125 to the cover point generator to define depth and width of cover events for generating cover points. Further, the user 210 may provide a list of critical points 212. The cover point generator may use the list of critical points 212 to insure that these points will be covered and not avoided during the cover point generation process described herein.

Figures 3, 4:
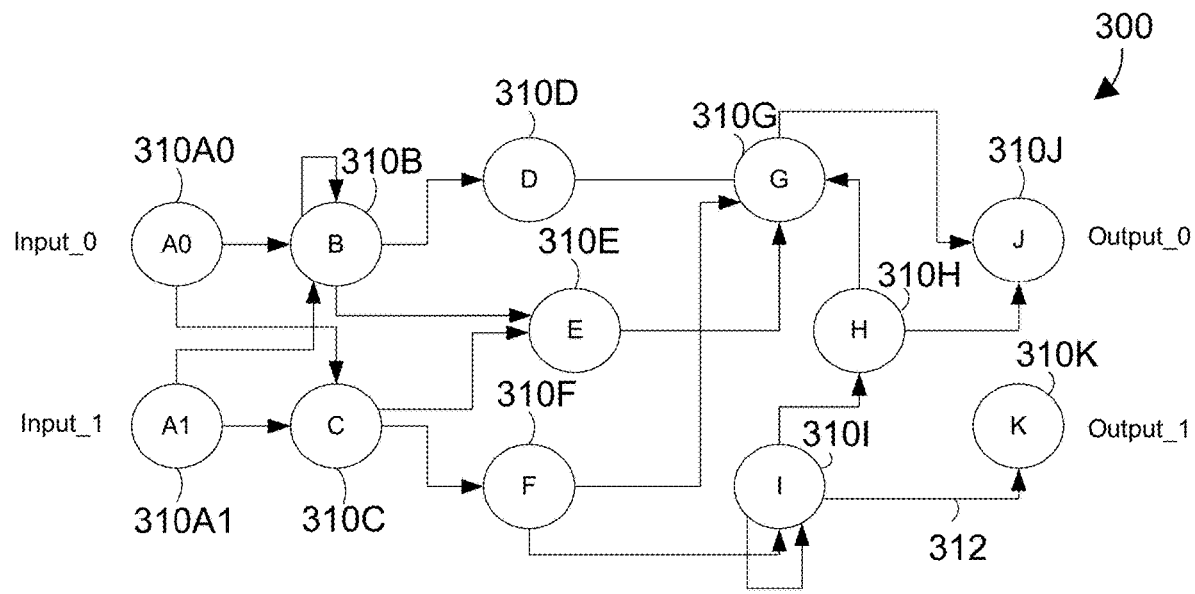
FIG. 3 is simplified block diagram that represents an example of a hardware design.
FIG. 4 is a table of node information for the hardware design shown in FIG. 3.

FIG. 3 is a simplified block diagram that represents a sample hardware design 300. Hardware design 300 is an example of hardware design 126 in FIG. 2. The hardware design 300 represents the description of an electronic circuit described in register-transfer level of a hardware description language. In this example, the hardware design 300 is shown in a graphical representation where each circle in the block diagram represents a node of the hardware design. FIG. 3 is thus a graphical representation of a hardware design derived from the registry transfer level description of the hardware design. The hardware design represented in the register transfer level can be supplied by a prior art tool for rendering hardware designs. In this example, the hardware design 300 includes node A0 310A0 through node K 310K which are collectively referred to as nodes 310. As used herein, the term node refers to a signal of the hardware design. A node can thus be considered an output signal of a functional block or circuit of the hardware design. Transitions are node to node connections and represented by directional in/out arrows between the nodes 310. The transitions are collectively referenced as transitions 312.

Again referring to FIG. 3, each node 310 of the hardware design 300 can be characterized with one or more properties. In the examples described herein, each node includes the properties of total node weight, node in weight, node out weight, and node improbability rating. The total node weight is the total number of in/out arrows or transitions into a node. The node in weight is the total number of arrows into a node or sometimes called fan-in. The node out weight is the total number of arrows out of a node and sometimes called fan-out. The node improbability rating is the uncertainty that a node value will be changed when a circuit with the hardware design is in operation. The hardware design 300 can be further characterized with transition properties. In the examples described herein, the transition properties include transition path weight. These properties can be set up as parameters for the cover point generator 123 for filtering the possible cover points to generate the output cover points 124 as described further below. The hardware design may include other properties not illustrated in the examples that can similarly be used to determine cover points as described herein.

As introduced above, each node 310 is a signal of the of the hardware design 300. In the example hardware design in FIG. 3, nodes A0 310A0 and A1 310A1 are input nodes and only have output arrows to subsequent nodes. Conversely, nodes J 310J and K 310K are output nodes and only have input arrows. The remaining nodes have a combination of input arrows and output arrows. For example, node B 310B has input arrows from nodes A0, A1 and itself (B). Node B 310B also has output arrows to node D and node E. The total weight characteristic of node B 310B is 6, since there are a total of 6 arrows in and out of node B 310B. The in weight of node B 301B is 3, where there are 3 in arrows into node B 310B. Similarly, the out weight of node B 310B is 3 where there are three out arrows from node B 310B.

Each node 310 of the hardware design 300 also has a characteristic called the improbability rating that indicates the uncertainty that a node value will be changed when a circuit with the hardware design is in operation. As used herein, the improbability rating is a calculated value for each node that depends on the improbability rating of inputs to the node and multiplying factors that depend on the function of the hardware producing the signal of the node. The function of the hardware may be represented as a logical expression and this logical expression can be used to calculate the improbability rating. Thus each input to the node is multiplied by an appropriate factor and then added together to get an improbability rating. Other similar methods could be used to produce the improbability rating. Examples of the improbability ratings are described below with reference to FIG. 4.

FIG. 4 illustrates a table of node information 400 for the hardware design shown in FIG. 3. The node information includes a row of data for each node of the hardware design 300. The node information includes columns for the node name 412, total weight 414, in weight 416, out weight 418, node expression 420 and improbability rating 422. The data in the total weight 414, in weight 416, and out weight 418 columns of the node information table 400 correspond to the characteristics for the corresponding node as described above. The cover point generator 123 inputs the hardware design 300 and generates these values. The generated values may be stored in a suitable file or database table in the manner shown. The cover point generator may then use this data to output cover points as described further below.

Again referring to FIG. 4, the node information table 400 further includes columns for the node expression 420 and a corresponding improbability rating 422. The node expression for each node is determined by the cover point generator from the hardware design represented in the hardware description language (HDL). The node expressions 420 thus represent a logical expression for the hardware of the corresponding node operating on the inputs to the node. The logical expressions include node signals and logical operators. In the illustrate example, the operators of the expressions 420 include logical AND represented by a dot, logical OR represented by a plus sign (+), logical NOT represented by an apostrophe (!) and a logical Exclusive OR represented by an X.

As introduced above, the improbability rating is a calculated value for each node that depends on the improbability rating of inputs to the node and multiplying factors that depend on the function of the expression of the node. These multiplying factors may be set in the software or by the user. For instance, in the following examples, the multiplying factors for the AND functions is 3. Also, in the illustrated examples, the input nodes are assumed to have a default value of 1. The improbability ratings 422 for each of the remaining nodes are calculated as shown. For example, node B was found to have the expression of (A0·A1)+(B). The improbability rating for node B is calculated as (Improbability rating of node A0×AND Factor+Improbability rating of node A1×AND factor)+improbability rating of node B. Using an AND factor of 3, this yields the improbability rating for node B=(1×3+1×3)+1=7. Similarly, node E is found to have an expression of B×C. The improbability rating for node E is calculated as (Improbability rating of B×EXOR Factor+Improbability rating of C×EXOR factor). Using an EXOR factor of 2, this yields the improbability rating for node E=(7×2+2×3)=27. The other improbability ratings 422 may be calculated in a similar manner.

The cover point generator 123 uses one or more parameters applied to the node information to select cover points. The parameters may include an expression and one or more of the node characteristics described above. For example, parameters for selecting nodes could include total weight, in weight and/or out weight greater than or equal to a selected value. For example, a parameter may be "total weight>=3". A parameter for selecting nodes may also include the improbability rating for the node greater than a selected value. For example, a parameter may be "improbability rating>8". Further, a parameter may include a transition property such as transition path weight>1 as described further with reference to FIG. 5B. The cover point generator may generate a default parameter set based on the node and transition analysis. Further, the cover point generator may allow the user to overwrite the default parameters by allowing the user to modify the parameters used for filtering the nodes and transitions to select output cover points. Thus the user may determine to increase or decrease the selected value for one of the above parameters. For example, if the number of cover points appears to be insufficient as determined by the user, the user may modify the default parameter from total weight greater than or equal to 5 to greater than or equal to 3.

Figure 5A:
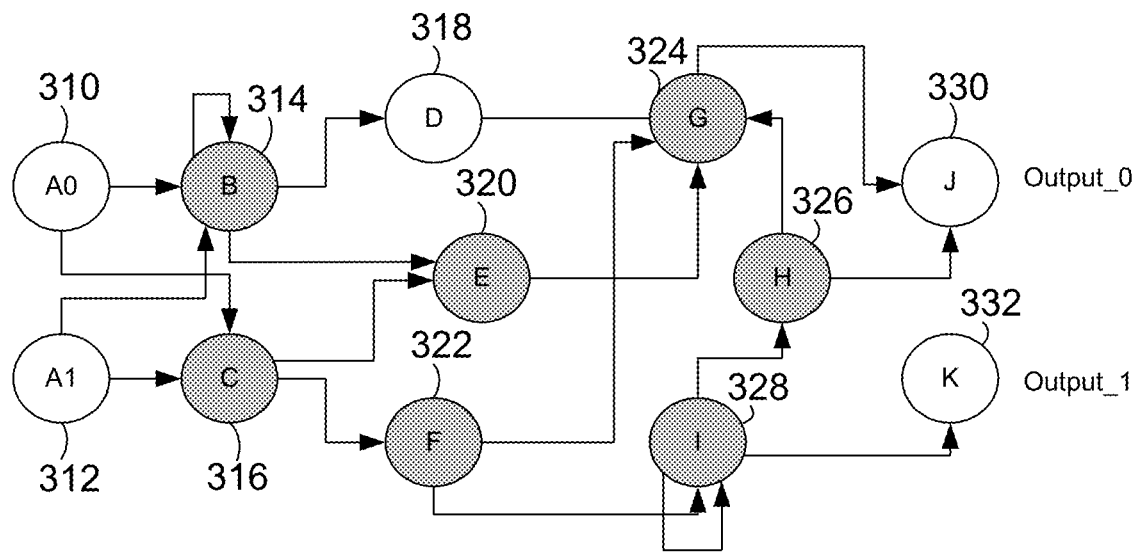

FIG. 5A illustrates an example of the cover point generator 123 (FIG. 1) using a parameter applied to the node information shown in FIG. 4 to select cover points. In this example, it is assumed that the parameter applied to the node information in FIG. 4 is total weight>=3. Using this parameter, the cover point generator would select the darkened nodes, namely nodes B, C, E, F, G, H and I. These nodes represent the nodes in the hardware design 300 that have a total in weight of 3 or more as shown in the node information 400 in FIG. 4. These nodes may then be converted to cover points as described below with reference to FIG. 5C.

Figure 5B:
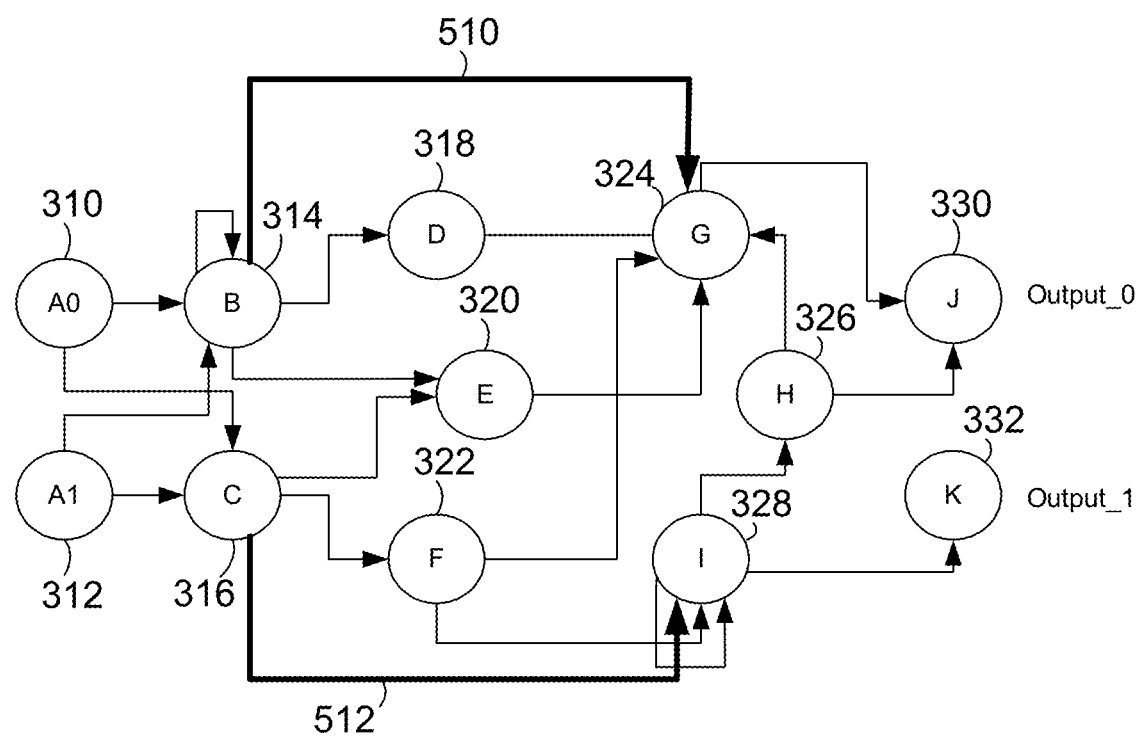

FIG. 5B illustrates an example of the cover point generator 123 using a transition parameter applied to the node information shown in FIG. 3 to select cover points. Here, a "cover point" includes a transition between nodes or two or more subsequent events in the hardware design. In the example shown in FIG. 5B, it is assumed that the parameter applied to the node information in FIG. 3 is a transition path weight of 2. Using this parameter, the cover point generator would select the transition paths 510 and 512. These transition paths represent paths in the hardware design 300 that have a path weight of 2. There is a tradeoff between selecting larger and smaller path weights as far as quantity and quality of cover point cover. Selecting a larger path weight would result in fewer hits and a smaller path weight would return more cover points.

As described above, the cover point generator filters the nodes and transitions per the parameters. Initially, the parameters used by the cover point generator may be a default parameter set that is generated based on node and transition analysis. The user may then be allowed to modify and overwrite the default parameter set. The cover point generator may generate the default parameter set in an appropriate manner based on node and transition analysis. For example, the cover point generator may adjust the parameters of the in weight, out weight, total weight and improbability rating until a preferred coverage ratio is reached. For example, the parameters could be adjusted and analyzed until a preferred ratio of covered points to total points is reaches, e.g. 50%. The adjusted parameters yielding the preferred ratio could then be used as the default set of parameters. In a preferred example, the default parameters are generated while adjusting one parameter at a time such that during the determination of a default parameter the range of other parameters is constant or unaltered.

Figure 5C:
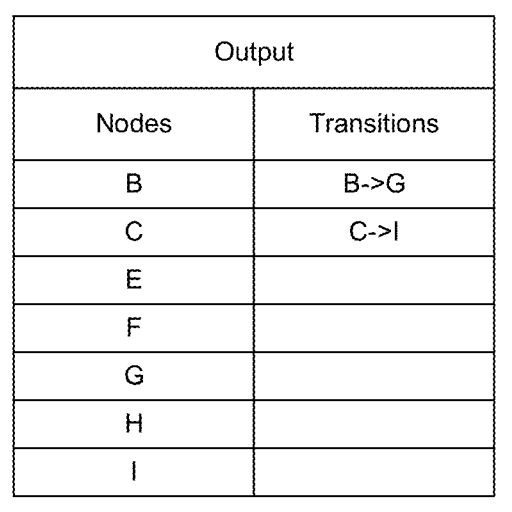

FIG. 5C illustrates an example of the output of cover points generated by the cover point generator 123 for the example above in FIGS. 5A and 5B. The cover point generator filters the nodes and transitions per the parameters as described above and outputs a hit list or set of cover points corresponding to the filtered nodes and transitions as shown. These cover points are used by the developers to insure functional testing includes these cover points.

Figure 6:
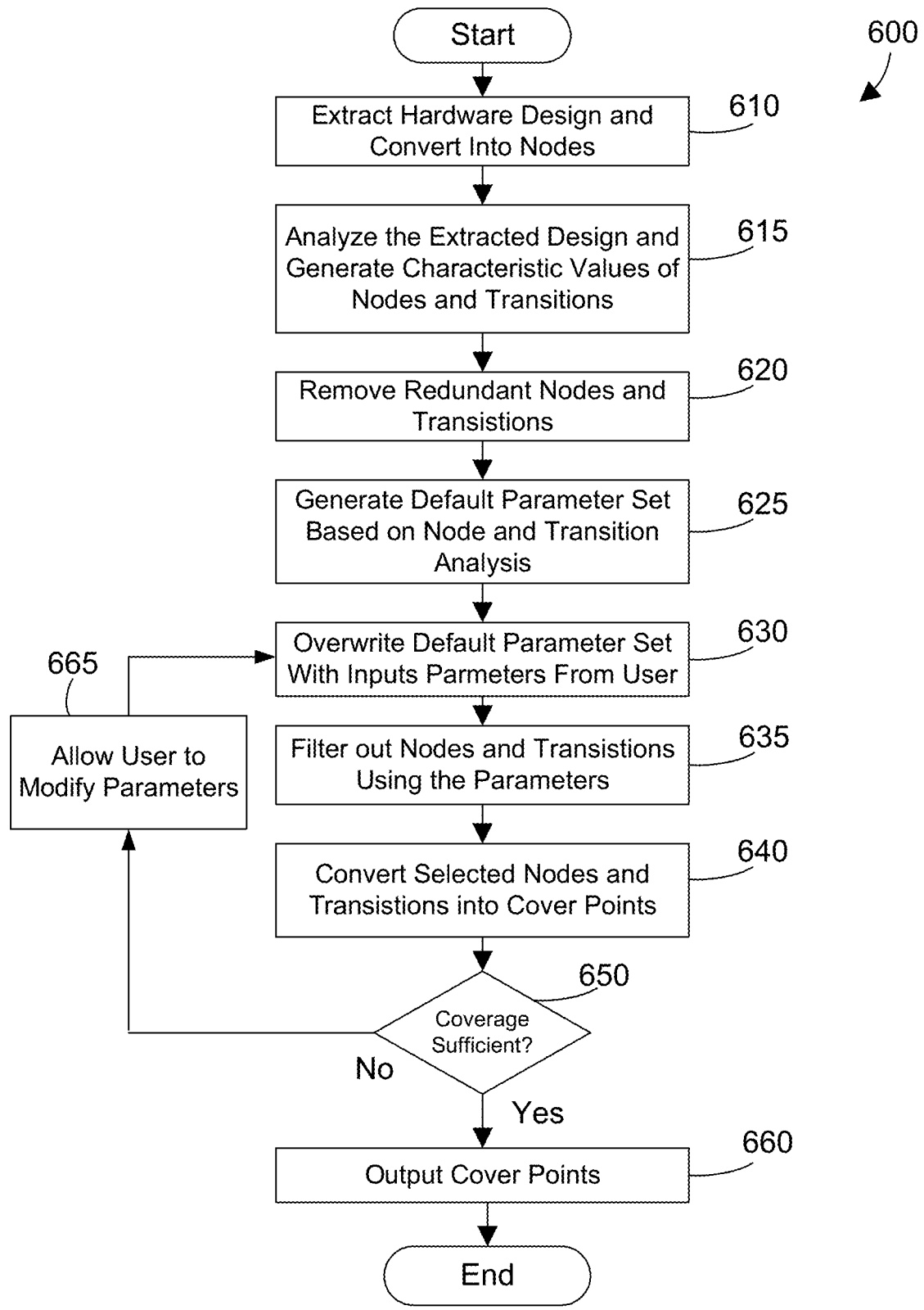
FIG. 6 is a flow diagram of a method for automatically generating cover points for a circuit design.

Referring to FIG. 6, a method 600 shows one suitable example for automatically generating cover points for functional verification of an integrated circuit based on register transfer level (RTL) analysis. Portions of method 600 are preferably performed by the cover point generator 123 and user as shown in FIG. 2. First, extract the hardware design from a hardware description language representation and convert into nodes (step 610). Next, analyze the extracted design and generate characteristic values of nodes and transitions (step 615). Remove redundant nodes and transitions (step 615). Generate default parameter set based on node and transition analysis (step 625). Then overwrite the default parameter set if there are inputs parameters from a user (step 630). Filter out nodes and transitions using the parameters (step 635). Convert the selected nodes and transitions into cover points (step 640). If there is sufficient cover (step 650=yes) then output the cover points (step 660). Method 500 is then done. If there is not sufficient cover (step 650=no) then allow the user to modify the parameters (step 665) and go to step 630.

The claims and disclosure herein support an apparatus comprising: at least one processor; a memory coupled to the at least one processor; a cover point generator residing in the memory and executed by the at least one processor that analyzes a hardware design represented in a hardware description language, generates characteristic values for nodes and transitions of the hardware design and filters the nodes and transitions based on one or more parameters applied to the characteristic values to output a list of cover points for verification of the hardware design.

The claims and disclosure herein further support a computer-implemented method executed by at least one processor for cover point generation for a hardware design of an electronic circuit comprising: analyzes the hardware design represented in a hardware description language; generating characteristic values of nodes and transitions of the hardware design and filtering the nodes and transitions based on one or more parameters applied to the characteristic values to output a list of cover points for verification of the hardware design.

The claims and disclosure herein additionally support a computer-implemented method executed by at least one processor for cover point generation for a hardware design of an electronic circuit comprising: analyzing the hardware design represented in register transfer level of a hardware description language; generating characteristic values of nodes and transitions of the hardware design; removing redundant nodes and transitions; generating a default parameter set based on the analysis of the hardware design wherein the parameters are an expression that includes one of the node and transition characteristics; allowing a user to modify the parameters and overwriting the default parameters with the user modified parameters; filtering the nodes and transitions based on one or more parameters applied to the characteristic values to output a list of cover points for verification of the hardware design; and wherein the characteristic values include node characteristics comprising total weight, in weight; out weight and improbability rating that is a value that represents the uncertainty that a node value will be changed when a circuit with the hardware design is in operation.

The cover point generator provides cover points for functional verification of a hardware design of an integrated circuit based on analysis of the hardware design represented in a hardware description language. The cover point generator uses uncertainty of event occurrence, critical point analysis and redundancy elimination to determine consequential cover points for function verification. A user may provide input parameters to the cover point generator to define depth and width of cover events for generating cover points.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a cover point generator residing in the memory and executed by the at least one processor that analyzes a hardware design represented in register transfer level of a hardware description language, generates characteristic values for nodes and transitions of the hardware design, removes redundant nodes and transitions, generates a default parameter set based on the analysis of the hardware design wherein the parameters are an expression that includes one of the node and transition characteristics, allows a user to modify the parameters and overwriting the default parameters with the user modified parameters, filters the nodes and transitions based on one or more parameters applied to the characteristic values to output a list of cover points, where the cover points identify locations in the hardware design where testing is needed for verification of the hardware design, outputs the list of cover points; and
   wherein the characteristic values include node characteristics comprising total weight, in weight, out weight and improbability rating that is a value that represents the uncertainty that a node value will be changed when a circuit with the hardware design is in operation.

2. The apparatus of claim 1 wherein the characteristic values include node and transition characteristics.

3. The apparatus of claim 2 wherein the transition characteristics include transition path weight.

4. The apparatus of claim 1 wherein improbability rating is a calculated value based on inputs of an expression for a circuit of the hardware design multiplied by a factor which depends on an operation of the expression.

5. A computer-implemented method executed by at least one processor for cover point generation for a hardware design of an electronic circuit comprising:
   analyzing the hardware design represented in register transfer level of a hardware description language;
   generating characteristic values of nodes and transitions of the hardware design;
   removing redundant nodes and transitions;
   generating a default parameter set based on the analysis of the hardware design wherein the parameters are an expression that includes one of the node and transition characteristics;
   allowing a user to modify the parameters and overwriting the default parameters with the user modified parameters;
   filtering the nodes and transitions based on one or more parameters applied to the characteristic values to output a list of cover points, where the cover points identify locations in the hardware design where testing is needed for verification of the hardware design;
   outputting the list of cover points; and
   wherein the characteristic values include node characteristics comprising total weight, in weight, out weight and improbability rating that is a value that represents the uncertainty that a node value will be changed when a circuit with the hardware design is in operation.

6. The method of claim 5 wherein the characteristic values include node and transition characteristics.

7. The method of claim 6 wherein the transition characteristics include transition depth.

8. The method of claim 5 wherein improbability rating is a calculated value based on inputs of an expression for a circuit of the hardware design multiplied by a factor which depends on an operation of the expression.

* * * * *